(12) United States Patent
Mao et al.

(10) Patent No.: US 9,544,125 B2
(45) Date of Patent: Jan. 10, 2017

(54) INTERFERENCE CANCELLATION METHOD AND APPARATUS, FILTER DEVICE

(71) Applicant: Huawei Technologies Co., Ltd., Shenzhen, Guangdong (CN)

(72) Inventors: Mengda Mao, Shenzhen (CN); Siqing Ye, Shenzhen (CN); Qian Yin, Shenzhen (CN); Tao Pu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 14/336,709

(22) Filed: Jul. 21, 2014

(65) Prior Publication Data
US 2014/0328222 A1   Nov. 6, 2014

Related U.S. Application Data

(63) Continuation of application No. PCT/CN2012/071192, filed on Feb. 16, 2012.

(30) Foreign Application Priority Data

Jan. 21, 2012 (CN) .......................... 2012 1 0019762

(51) Int. Cl.
*H04L 5/14* (2006.01)
*H04B 1/525* (2015.01)
*H04W 28/04* (2009.01)

(52) U.S. Cl.
CPC ............. *H04L 5/1461* (2013.01); *H04B 1/525* (2013.01); *H04W 28/048* (2013.01)

(58) Field of Classification Search
None
See application file for complete search history.

(56) References Cited

U.S. PATENT DOCUMENTS 7,123,591 B1    10/2006  Ostertag et al.
2003/0174763 A1  9/2003  Kouki
(Continued)

FOREIGN PATENT DOCUMENTS

CN         1354909 A    6/2002
CN         2826837 Y   10/2006
(Continued)

*Primary Examiner* — Jung Park
*Assistant Examiner* — Jamaal Henson
(74) *Attorney, Agent, or Firm* — Leydig, Voit & Mayer, Ltd.

(57) ABSTRACT

An interference cancellation method and apparatus and also a filter are disclosed to cancel the interfering signals leaked to the receiving channel, and enable the receiving channel to suppress the transmitted signal. The method includes: dividing a transmitted signal into a first transmitted signal and a second transmitted signal, and then inputting the first transmitted signal into a first transmitting filter and inputting the second transmitted signal into a second transmitting filter symmetric to the first transmitting filter; adjusting the first interfering signal and the second interfering signal to make opposite phases of the signals; and combining the signals of opposite phases. The method provided herein can cancel the interfering signals leaked to the receiving channel, the receiving channel suppresses the transmitted signal effectively, and the interference caused by the transmitted signal onto the received signal is cancelled.

20 Claims, 12 Drawing Sheets

---

Divide a transmitted signal into a first transmitted signal and a second transmitted signal, and then input the first transmitted signal into a first transmitting filter and input the second transmitted signal into a second transmitting filter symmetric to the first transmitting filter — S101

Adjust a first interfering signal and a second interfering signal to obtain signals of opposite phases, where the first interfering signal includes a signal leaked from the first transmitted signal to a receiving channel after the first transmitted signal flows through the first transmitting filter and a first receiving filter, the second interfering signal includes a signal leaked from the second transmitted signal to the receiving channel after the second transmitted signal flows through the second transmitting filter and a second receiving filter, and the receiving channel is a channel for a receiver to receive signals — S102

Combine the signals of opposite phases — S103

(56) References Cited

U.S. PATENT DOCUMENTS

| | | |
|---|---|---|
| 2007/0015468 A1 | 1/2007 | Kouki et al. |
| 2009/0079753 A1 | 3/2009 | Alessi et al. |
| 2011/0069644 A1* | 3/2011 | Kim .................. H04B 1/0057 |
| | | 370/278 |
| 2012/0163245 A1 | 6/2012 | Tone et al. |
| 2014/0023188 A1* | 1/2014 | Fadili .................. H04M 9/082 |
| | | 379/406.01 |

FOREIGN PATENT DOCUMENTS

| | | |
|---|---|---|
| CN | 101888252 A | 11/2010 |
| CN | 102231638 A | 11/2011 |
| JP | 2008177956 A | 7/2008 |
| JP | 2012138651 A | 7/2012 |
| KR | 20050023642 A | 3/2005 |
| KR | 20100064385 A | 6/2010 |
| WO | WO 2011131092 A1 | 10/2011 |

* cited by examiner

INTERFERENCE CANCELLATION METHOD AND APPARATUS, FILTER DEVICE

CROSS-REFERENCE TO RELATED APPLICATIONS

This application is a continuation of International Patent Application No. PCT/CN2012/071192, filed on Feb. 16, 2012, which claims priority to Chinese Patent Application No. 201210019762.7, filed on Jan. 21, 2012, both of which are hereby incorporated by reference in their entireties.

TECHNICAL FIELD

The present invention relates to the field of radio communication and, in particular, to an interference cancellation method and apparatus, and a filter device.

BACKGROUND

In duplex radio communication, to make a transmitter and a receiver in a frequency division multiplexing (FDM) system share an antenna, a duplexer needs to distinguish a transmitted signal from a received signal. Generally, the duplexer is composed of a transmitter filter, a receiver filter, a combinational circuit, and so on. The combinational circuit includes reactive components such as transmission line, resistor, and capacitor. The combinational circuit is essentially a phasing circuit that can reduce mutual impact between the transmitter filter and the receiver filter.

Generally, duplexers include cavity duplexer, dielectric duplexer, surface acoustic wave (SAW) filter, bulk acoustic resonator (BAR), and film bulk acoustic resonator (FBAR). The FBAR is a duplexer based on a bulk acoustic resonance technology, and converts the electric energy into acoustic waves to generate resonance through a converse piezoelectric effect of a piezoelectric film. The wave velocity of the acoustic wave is less than the wave velocity of the electromagnetic wave by about 5 orders of magnitude. Therefore, under the same working frequency, the size of the FBAR may be far less than the size of the electromagnetic-based dielectric porcelain device. Meanwhile, because the bulk acoustic wave has a greater power bearing capability than the surface acoustic wave, the FBAR has a better power capacity feature than the surface acoustic filter.

With development of communication technologies, the operator requires smaller and smaller size of the communication system. Especially, the emergence of new base station forms imposes more intense requirements on the small size of the system. Currently, many discrete devices in the radio part have been replaced. Especially, the discrete devices in the receiver, such as low noise amplifier (LNA), variable gain amplifier, and intermediate frequency filter, have been integrated into a radio integrated circuit. It is very significant to replace cavity duplexers with small-sized duplexers. In a multi-carrier transceiver, a high requirement is imposed on the duplexer suppression (namely, the ratio of signals leaked to the receiving channel to signals transmitted by the transmitter; smaller value of this ratio means weaker interference to the received signals). Traditional small filters can hardly fulfill the strict requirement imposed by the base station. Therefore, how to reduce the suppression requirement is a linchpin of reducing the size of the duplexer.

A solution to reducing the suppression requirement imposed by the transmitter onto the receiver in the prior art is to simulate interference cancellation. In this solution, an amplitude phase regulator adjusts the phase of the transmitted signal that is coupled from the transmitting channel in a interference cancellation channel, and outputs the signal; on the receiver side, the transmitted signal whose phase is adjusted by the amplitude phase regulator is overlaid with the transmitted signal leaked from the transmitting filter on the transmitting channel, thereby cancelling the interference caused by the transmitted signal onto the received signal.

The inventors of the present invention through their research find that in the prior art, due to the outband (band outside the transmitting band) filter feature of the transmitting filter on the transmitting channel, the outband amplitude and phase response fluctuates sharply, the delay changes sharply, but the receiving band of the receiving filter in the interference cancellation channel is a passband (a passband is a band outside the transmitting band of the transmitting filter), and the amplitude and phase response of the receiving filter is relatively constant compared with the outband amplitude and phase response of the transmitting filter on the transmitting channel. Therefore, even if the amplitude phase regulator can adjust the phase of the transmitted signal output by the transmitting filter on the interference cancellation channel, the phase of the transmitted signal is not necessarily opposite to the phase of the transmitted signal output by the transmitting filter on the transmitting channel after the phase is adjusted. Consequently, the interference caused by the transmitted signal onto the received signal is not cancelled, and even may be exacerbated. For example, due to the outband phase fluctuation of the transmitting filter on the transmitting channel, after the phase is adjusted by the amplitude phase regulator, the phase of the transmitted signal coupled from the transmitting channel is just the same as the phase of the transmitted signal output by the transmitting filter on the transmitting channel. In this case, the interference caused by the transmitted signal onto the received signal is not cancelled, and even increased drastically.

SUMMARY

An interference cancellation method and apparatus and also a filter device are provided in embodiments of the present invention to cancel the interfering signals leaked to the receiving channel, and enable the receiving channel to suppress the transmitted signal.

An interference cancellation method provided in an embodiment of the present invention includes: dividing a transmitted signal into a first transmitted signal and a second transmitted signal, and then inputting the first transmitted signal into a first transmitting filter and inputting the second transmitted signal into a second transmitting filter symmetric to the first transmitting filter;

adjusting a first interfering signal and a second interfering signal to obtain signals of opposite phases, where the first interfering signal includes a signal leaked from the first transmitted signal to a receiving channel after the first transmitted signal flows through the first transmitting filter and a first receiving filter, the second interfering signal includes a signal leaked from the second transmitted signal to the receiving channel after the second transmitted signal flows through the second transmitting filter and a second receiving filter, and the receiving channel is a channel for a receiver to receive signals; and combining the signals of opposite phases.

Further, an interference cancellation apparatus provided in an embodiment of the present invention includes:

a signal dividing module, configured to divide a transmitted signal into a first transmitted signal and a second transmitted signal, and then input the first transmitted signal into a first transmitting filter and input the second transmitted signal into a second transmitting filter symmetric to the first transmitting filter;

a phasing module, configured to adjust a first interfering signal and a second interfering signal to obtain signals of opposite phases, where the first interfering signal includes a signal leaked from the first transmitted signal to a receiving channel after the first transmitted signal flows through the first transmitting filter and a first receiving filter, the second interfering signal includes a signal leaked from the second transmitted signal to the receiving channel after the second transmitted signal flows through the second transmitting filter and a second receiving filter, and the receiving channel is a channel for a receiver to receive signals; and a combining module, configured to combine the signals of opposite phases.

Further, a filter device provided in an embodiment of the present invention includes a first duplexer and a second duplexer. The first duplexer includes a first receiving filter and a first transmitting filter, and the second duplexer includes a second receiving filter and a second transmitting filter. The first transmitting filter is symmetric to the second transmitting filter; or, the first receiving filter is symmetric to the second receiving filter and the first transmitting filter is symmetric to the second transmitting filter.

Further, a filter device provided in an embodiment of the present invention includes a first receiving filter, a first transmitting filter, and a duplexer. The duplexer includes a second receiving filter and a second transmitting filter, where the first transmitting filter is symmetric to the second transmitting filter; or, the first receiving filter is symmetric to the second receiving filter and the first transmitting filter is symmetric to the second transmitting filter.

Further, a filter device provided in an embodiment of the present invention includes a first transmitting filter and a second transmitting filter. The first transmitting filter and the second transmitting filter are integrated on the same chip, or integrated on the same substrate, or integrated in the same package, or integrated in the same module.

Further, a filter device provided in an embodiment of the present invention includes a first receiving filter and a second receiving filter. The first receiving filter and the second receiving filter are integrated on the same chip, or integrated on the same substrate, or integrated in the same package, or integrated in the same module.

Further, a filter device provided in an embodiment of the present invention includes a first duplexer and a second duplexer. The first duplexer and the second duplexer are integrated on the same chip, or integrated on the same substrate, or integrated in the same package, or integrated in the same module.

Further, a filter device provided in an embodiment of the present invention includes a first receiving filter, a first transmitting filter, and a duplexer. The duplexer, the first receiving filter, and the first transmitting filter are integrated on the same chip, or integrated on the same substrate, or integrated in the same package, or integrated in the same module.

A base station provided in an embodiment of the present invention includes the interference cancellation apparatus provided above.

Further, a communication system provided in an embodiment of the present invention includes the base station provided above.

As revealed in the embodiments above, the first transmitted signal is input into the first transmitting filter, the second transmitted signal is input into the second transmitting filter, and the first transmitting filter is symmetric to the second transmitting filter; the interfering signals output from the first transmitting filter and the second transmitting filter are finally adjusted to become signals of opposite phases, and are combined. Therefore, the method and the apparatus provided herein can cancel the interfering signals leaked to the receiving channel, the receiving channel suppresses the transmitted signal effectively, and the interference caused by the transmitted signal onto the received signal is cancelled.

BRIEF DESCRIPTION OF DRAWINGS

To describe the technical solution of the present invention more clearly, the following outlines the accompanying drawings involved in description of the embodiments of the present invention or the prior art. Apparently, the accompanying drawings are illustrative rather than exhaustive, and persons skilled in the art can derive other drawings from them without making any creative effort.

DESCRIPTION OF EMBODIMENTS

The technical solutions in embodiments of the present invention are hereinafter described clearly and completely with reference to the accompanying drawings. Apparently, the described embodiments are only some exemplary embodiments of the present invention, rather than all the embodiments of the present invention. All other embodiments, which can be derived by persons skilled in the art from the embodiments given herein without making any creative effort, should fall within the protection scope of the present invention.

In embodiments of the present invention, "A and/or B" refers to A, or B, or both A and B; "A/B" generally refers to "A or B", where A and B represent the objects before and after "and/or" and "/".

Figure 1:
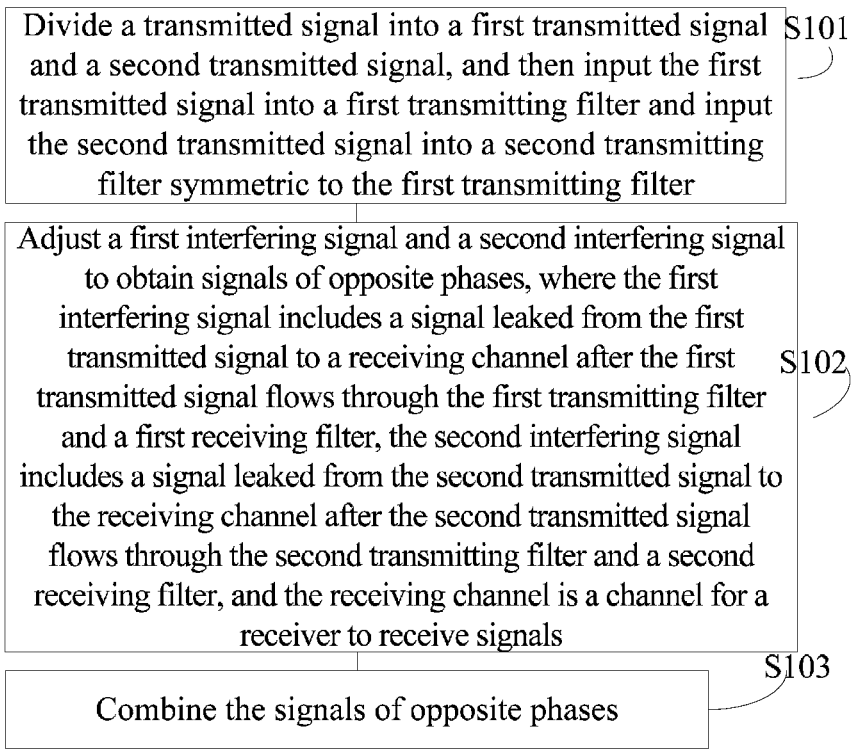
FIG. 1 is a schematic flowchart of an interference cancellation method according to an embodiment of the present invention.

FIG. 1 is a schematic flowchart of an interference cancellation method according to an embodiment of the present invention. The method shown in FIG. 1 is applicable to a transceiver in an FDM system, and includes the following steps:

S101. Divide a transmitted signal into a first transmitted signal and a second transmitted signal, and then input the first transmitted signal into a first transmitting filter and input the second transmitted signal into a second transmitting filter symmetric to the first transmitting filter.

In embodiments of the present invention, a transmitted signal refers to a signal output from a digital processing unit of a transceiver, processed by the modules such as digital-to-analog converter, frequency mixer, filter, and amplifier on the transmitting channel, and to be transmitted from antenna port; and a received signal refers to a signal received from the antenna port, to be processed by the modules such as amplifier, filter, frequency mixer, and analog-to-digital converter on the receiving channel, and to be input into the digital processing unit of the transceiver. The transceiver is applied to a frequency division duplexing (FDD) band, and the transmitted signal and the received signal share an antenna. Therefore, the band occupied by the transmitted signal (namely, transmitting band) alternates with the band occupied by the received signal (namely, receiving band), or, the passband of the transmitter is the stopband of the receiver, or, the stopband of the transmitter is the passband of the receiver. The transmitting channel refers to a channel for the transmitter to transmit signals, and the receiving channel refers to a channel for the receiver to receive signals. It should be noted that because the receiving band is a main band occupied by the received signals, the receiving band is generally used to represent the receiving channel, or the receiving channel represents the receiving band; it is the same with the relationship between the transmitting band and the transmitting channel. Due to factors such as non-linearity of devices, when signals are transmitted, part of the transmitted signals and/or intermodulation signals derived from the transmitted signals may be leaked to the receiving channel, and cause interference onto the received signals. Suppression of the interference is also known as suppression performed by the receiving channel for the transmitted signals.

Because the size of the FBAR or SAW is small, the transceiver made up of the FBAR or SAW well fulfills the small size requirement imposed by the operator on the communication system. Therefore, in the embodiments of the present invention, the first transmitting filter and the second transmitting filter may be, but are not limited to, the FBAR or SAW. Other filters of a small size, such as BAW, may be used as the first transmitting filter and the second transmitting filter instead. FBAR, SAW and BAW employ a wafer cutting process. In the cutting process, two adjacent filters or duplexers on the wafer may be set onto the same chip (die or chip) through cutting. In this way, it is easy to ensure consistent electric performance between two filters or duplexers located on the same chip. For example, in the embodiments of the present invention, through such a cutting mode, the first transmitting filter and the second transmitting filter may be located on the same chip, and the first transmitting filter is symmetric to the second transmitting filter. The first transmitting filter is symmetric to the second transmitting filter. That is, the first transmitting filter and the second transmitting filter have symmetrically the same structure and features. For example, the features such as transmission response delay, phase and amplitude of the first transmitting filter are the same as those of the second transmitting filter. Besides, the symmetry between the first transmitting filter and the second transmitting filter is not limited to the phenomenon that the first transmitting filter and the second transmitting filter have the same structure and features. To just fulfill the objectives of the present invention, it is enough if the electric performance is consistent between the first transmitting filter and the second transmitting filter. Consistent electric performance means that: The electric performance is completely the same, or, the impact caused by the electric performance difference onto the interference cancellation result is in an acceptable range, and a certain deviation is allowed. Understandably, in "the same structure and features", the meanings of word "same" also cover the scenario that the impact caused by the difference of the structure or features onto the interference cancellation result is in an acceptable range. With the same structure and features, consistent electric performance is ensured. The definition of "symmetric" is also applicable to other embodiments of the present invention. The electric performance may include transmission response delay, phase, amplitude, and so on.

In all embodiments of the present invention, to accomplish consistent electric performance between the first transmitting filter and the second transmitting filter, the first transmitting filter and the second transmitting filter may be integrated on the same chip (die or chip), or integrated on the same substrate, or integrated in the same package, or integrated in the same module. In all embodiments of the present invention, it is assumed that the first transmitting filter and the second transmitting filter are integrated on the same substrate.

As an embodiment (embodiment 1) of the present invention, a divider may be applied. For example, a 90° divider or a 3 dB electric bridge divides the transmitted signal into a first transmitting signal and a second transmitted signal between which the phase difference is 90°; and then the first transmitting signal and the second transmitted signal, between which the phase difference is 90°, are input into the first duplexer and the second duplexer respectively, and then output by the first duplexer and the second duplexer. In this embodiment, through the structure of the divider, power of the signals input into the first duplexer and the second duplexer is lower than power of the undivided signal (theoretically, regardless of loss, the power of the signals input into the first duplexer and the second duplexer respectively is half of the power of the undivided signal). In this way, the power capacity requirement on the transmitting filter in the first duplexer or the second duplexer is lowered.

To keep the same temperature feature, in this embodiment, the first duplexer and the second duplexer may be integrated on the same substrate such as a silicon wafer semiconductor substrate; the first duplexer and the second duplexer that are integrated on the same substrate may be an FBAR or SAW, or may be a BAW; the first duplexer includes a first transmitting filter and a first receiving filter, and the second duplexer includes a second transmitting filter and a second receiving filter; and the symmetry between the first duplexer and the second duplexer includes symmetry between the first transmitting filter and the second transmitting filter, or includes symmetry between the first transmitting filter and the second transmitting filter, and symmetry between the first receiving filter and the second receiving filter. For the definition of "symmetry" or "symmetric", see the definition above. That is, symmetry between the first transmitting filter and the second transmitting filter refers to consistent electric performance between the first transmitting filter and the second transmitting filter, and symmetry between the first receiving filter and the second receiving filter refers to consistent electric performance between the first receiving filter and the second receiving filter. The meanings of "consistent electric performance" include: The electric performance is completely the same, or, the impact caused by the difference of the electric performance onto the interference cancellation result is in an acceptable range. The electric performance may include transmission response delay, phase, amplitude, and so on. The structure and features being the same is one of the scenarios of consistent electric performance. That is, symmetry scenarios include the scenario of the structure and features being the same.

In the first embodiment of the present invention, the first transmitted signal input into the first duplexer is output from the first transmitting filter of the first duplexer, and the second transmitted signal input into the second duplexer is output from the second transmitting filter of the second duplexer. Afterward, to avoid loss of the power or energy of the signal, the two transmitted signals (the first transmitted signal and the second transmitted signal) may be input into a 90° combiner-divider connected with the first duplexer and the second duplexer. The signals are combined in the combiner-divider, and the combined transmitted signal is output from the antenna port. Besides, the signal received from the antenna port is divided through the 90° combiner-divider. The divided signals are input into the first duplexer and the second duplexer for filtering, and then the signals pass through another 90° combiner-divider and are input into other devices on the receiving channel.

As another embodiment (embodiment 2) of the present invention, a coupler may couple part of the transmitted signal as the first transmitted signal, and input the first transmitted signal into the first receiving filter; the first receiving filter filters the first transmitted signal, and inputs it into the first transmitting filter, and then the first transmitting filter inputs the signal into the receiving channel. In this embodiment, to keep the same temperature feature, the first receiving filter, the first transmitting filter, and the duplexer inclusive of the second receiving filter and the second transmitting filter, may be integrated on the same substrate such as a silicon wafer semiconductor substrate; the first receiving filter, the first transmitting filter, and the duplexer that are integrated on the same substrate may be an FBAR or SAW, or may be a BAW. The first transmitting filter is symmetric to the second transmitting filter of the duplexer; or, the first transmitting filter is symmetric to the second transmitting filter of the duplexer, and the first receiving filter is symmetric to the second receiving filter of the duplexer. For the definition of "symmetry" or "symmetric", see the definition above. That is, symmetry between the first transmitting filter and the second transmitting filter of the duplexer refers to consistent electric performance between the first transmitting filter and the second transmitting filter of the duplexer, and symmetry between the first receiving filter and the second receiving filter of the duplexer refers to consistent electric performance between the first receiving filter and the second receiving filter of the duplexer. The meanings of "consistent electric performance" include: The electric performance is completely the same, or, the impact caused by the difference of the electric performance onto the interference cancellation result is in an acceptable range. The electric performance may include transmission response delay, phase, amplitude, and so on.

The structure and features being the same is one of the scenarios of consistent electric performance. That is, symmetry scenarios include the scenario of the structure and features being the same. Besides, the first receiving filter, the first transmitting filter, and the duplexer inclusive of the second receiving filter and the second transmitting filter may also be integrated on the same chip (die or chip), or integrated in the same package, or integrated in the same module so as to accomplish consistent electric performance between the first transmitting filter and the second transmitting filter in the duplexer, or, further, accomplish consistent electric performance between the first receiving filter and the second receiving filter in the duplexer. In all embodiments of the present invention, it is assumed that the first receiving filter, the first transmitting filter and the duplexer inclusive of the second receiving filter and the second transmitting filter are integrated on the same substrate. Understandably, "keep the same temperature feature" mentioned above also aims to accomplish better symmetry of the filters, namely, accomplish better consistency of electric performance between the first transmitting filter and the second transmitting filter in the duplexer, or, further, accomplish better consistency of electric performance between the first receiving filter and the second receiving filter in the duplexer.

The signal not coupled by the coupler in the transmitted signal may be input as a second transmitted signal into the duplexer which is integrated with the first transmitting filter on the same substrate (such as silicon wafer semiconductor substrate). Specifically, the second transmitted signal is input into the second transmitting filter of the duplexer. Here, the duplexer may also be integrated with the first transmitting filter in the same chip (die or chip), or integrated in the same package, or integrated in the same module, so as to accomplish consistent electric performance between the first transmitting filter and the second transmitting filter in the duplexer. In all embodiments of the present invention, it is assumed that the duplexer and the first transmitting filter are integrated on the same substrate.

Unlike the scenario in embodiment 1 above, in embodiment 2, the first transmitted signal output by the first transmitting filter is not combined with the second transmitted signal output by the second transmitting filter of the duplexer, but the second transmitting filter inputs the second transmitted signal into the antenna port connected with the duplexer, and the signal is sent out through the antenna. In this embodiment, the first transmitted signal is coupled by the coupler, and the power or energy of the first transmitted signal is small; the power or energy of the second transmitted signal is far greater than the power or energy of the first transmitted signal. Therefore, even if the signals are not combined, the power or energy of the original transmitted signal incurs no great loss, or the lost energy or power is ignorable.

S102. Adjust a first interfering signal and a second interfering signal to obtain signals of opposite phases, where the first interfering signal includes a signal leaked from the first transmitted signal to a receiving channel after the first transmitted signal flows through the first transmitting filter and a first receiving filter, the second interfering signal includes a signal leaked from the second transmitted signal to the receiving channel after the second transmitted signal flows through the second transmitting filter and a second receiving filter, and the receiving channel is a channel for a receiver to receive signals.

In this embodiment, after the transmitted signal is output from the divider, or is coupled into the transmitting filter or the receiving filter, although a majority of the signal passes through the transmitting filter and is finally sent out through the antenna port, part of the transmitted signal still passes through the receiving filter and flows back to the receiving channel. The signal that flows back to the receiving channel includes not only the transmitted signal not filtered out by the receiving filter, but also an intermodulation signal derived from the transmitted signal. For example, in this embodiment, the first interfering signal includes the signal leaked from the first transmitted signal to the receiving channel after the first transmitted signal flows through the first transmitting filter and the first receiving filter, and may be part of the first transmitted signal leaked to the receiving channel and/or the intermodulation signal derived from the first transmitted signal. On the route of the signal, the signal is output from the first transmitting filter to the first receiving filter, and then output from the first receiving filter; or the signal is output from the first receiving filter, passes through other modules (such as phase regulator), enters the first transmitting filter, and then is output from the first transmitting filter. The second interfering signal includes the signal leaked from the second transmitted signal to the receiving channel after the second transmitted signal flows through the second transmitting filter and the second receiving filter, and may be a part of the second transmitted signal leaked to the receiving channel and/or the intermodulation signal derived from the second transmitted signal. On the route of the signal, the signal is output from the second transmitting filter to the second receiving filter, and then is output from the second receiving filter.

Corresponding to step S101 in which the first duplexer and the second duplexer are integrated on the same substrate (such as silicon wafer semiconductor substrate), as an embodiment of the present invention, the first interfering signal output from the first receiving filter of the first duplexer and the second interfering signal output from the second receiving filter of the second duplexer may be input to a 90° combiner for 90° phase shift. The first transmitting filter is symmetric to the second transmitting filter, and the difference between the phase of the first transmitted signal and the phase of the second transmitted signal is 90°, and therefore, after the 90° combiner performs 90° phase shift for the part of the first transmitted signal output from the first receiving filter of the first duplexer and the part of the second transmitted signal output from the second receiving filter of the second duplexer, the final phase difference is 180°, namely, the two have opposite phases. Due to the outband filter feature of the transmitting filter, the transmitting filter is unable to filter out outband signals (namely, signals that occupy the band outside the transmitting band) completely. The intermodulation signal output from the first receiving filter, derived from the first transmitted signal, and occupying a band that overlaps the receiving band (namely, the band occupied by the received signal) is compared with the intermodulation signal output from the second receiving filter, derived from the second transmitted signal, and occupying a band that overlaps the receiving band, and the comparison shows that the phase difference between the two intermodulation signals is 90°. Therefore, after the 90° combiner performs 90° phase shift for the two intermodulation signals, the final phase difference is 180°, namely, the two have opposite phases.

Further, the first receiving filter may also be symmetric to the second receiving filter. In this way, the inconsistency of the outband filter feature of the receiving filter is overcome, and the effect of interference cancellation is strengthened. When the first receiving filter is symmetric to the second receiving filter, the relationship between the part of the first transmitted signal output from the first receiving filter of the first duplexer and the part of the second transmitted signal output from the second receiving filter of the second duplexer is similar to the relationship applicable when the first transmitting filter is symmetric to the second transmitting filter, namely, after the 90° combiner performs 90° phase shift, the final phase difference is 180°, namely, the two have opposite phases. In this way, the intermodulation signal output from the first receiving filter, derived from the first transmitted signal, and occupying a band that overlaps the transmitting band (and/or overlaps no receiving band) is compared with the intermodulation signal output from the second receiving filter, derived from the second transmitted signal, and occupying a band that overlaps the transmitting band and/or overlaps no receiving band, and the comparison shows that the phase difference between the two intermodulation signals is 90°. Therefore, after the 90° combiner performs 90° phase shift for the two intermodulation signals, the final phase difference is 180°, namely, the two have opposite phases.

Corresponding to step S101 in which the first receiving filter, the first transmitting filter, and a duplexer inclusive of the second receiving filter and the second transmitting filter are integrated on the same substrate (such as silicon wafer semiconductor substrate), as an embodiment of the present invention, the first interfering signal output from the first receiving filter may be input into a phase regulator for 180° phase shift. After undergoing the 180° phase shift performed by the phase regulator, the first interfering signal is input to the first transmitting filter. The first transmitting filter is symmetric to the second transmitting filter, and the phase of the signal output from the first transmitting filter is the same as the phase of the first transmitted signal output after the signal undergoes the 180° phase shift performed by the phase regulator, and therefore, the phase difference between the part of the first transmitted signal output from the first transmitting filter and the part of the second transmitted signal output from the second receiving filter is 180°, namely, the two have opposite phases. Due to the outband filter feature of the transmitting filter, the transmitting filter is unable to filter out outband signals completely. The phase of the intermodulation signal, which is output from the first transmitting filter, derived from the first transmitted signal, and occupying a band that overlaps the receiving band (namely, the band occupied by the received signal), is the same as the phase of the intermodulation signal output after the signal undergoes the 180° phase shift performed by the phase regulator. Therefore, the intermodulation signal output from the first transmitting filter, derived from the first transmitted signal, and occupying a band that overlaps the receiving band is compared with the intermodulation signal output from the second receiving filter, derived from the second transmitted signal, and occupying a band that overlaps the receiving band, and the comparison shows that the phase difference is 180°, namely, the two have opposite phases.

Further, the first receiving filter may also be symmetric to the second receiving filter. In this way, the inconsistency of the outband filter feature of the receiving filter is overcome, and the effect of interference cancellation is strengthened. When the first receiving filter is symmetric to the second receiving filter, the relationship between the part of the first transmitted signal output from the first transmitting filter and the part of the second transmitted signal output from the second receiving filter is similar to the relationship applicable when the first transmitting filter is symmetric to the second transmitting filter, namely, after the phase regulator performs the 180° phase shift, the final phase difference is 180°, namely, the two have opposite phases. The phase of the intermodulation signal, which is output from the first transmitting filter, derived from the first transmitted signal, and occupying a band that overlaps the transmitting band and/or overlaps no receiving band, is the same as the phase of the intermodulation signal output after the signal undergoes the 180° phase shift performed by the phase regulator. Therefore, the intermodulation signal output from the first transmitting filter, derived from the first transmitted signal, and occupying a band that overlaps the transmitting band (and/or overlaps no receiving band) is compared with the intermodulation signal output from the second receiving filter, derived from the second transmitted signal, and occupying a band that overlaps the transmitting band and/or overlaps no receiving band, and the comparison shows that the phase difference is 180°, namely, the two have opposite phases.

To accomplish a better effect of interference cancellation in this embodiment, the amplitude of the first interfering signal may be adjusted before, during or after the first interfering signal output from the first receiving filter is input into the phase regulator for undergoing the 180° phase shift. Specifically, the amplitude of the first interfering signal is adjusted as equal to the amplitude of the second interfering signal. In this way, after the phase regulator performs the 180° phase shift for the first interfering signal, if the first interfering signal is combined with the second interfering signal, the two interfering signals are completely cancelled.

S103. Combine the signals of opposite phases.

In this embodiment, combining the signals of opposite phases may be: inputting the two signals into a device respectively and overlaying the two signals in the device; or, inputting one of the signals into the device, and using a coupler to couple the other signal into the device, and overlaying the two signals in the device; or, inputting one of the signals into the device, letting the device output the signal, and using the coupler to couple the signal with the other signal. For example, if the first duplexer and the second duplexer are integrated on the same substrate (such as silicon wafer semiconductor substrate) in step S101, the 90° combiner performs 90° phase shift to obtain signals of opposite phases, and the signals may be overlaid in the 90° combiner directly, thereby the signals of opposite signals are combined. If the first receiving filter, the first transmitting filter, and a duplexer inclusive of the second receiving filter and the second transmitting filter are integrated on the same substrate (such as silicon wafer semiconductor substrate) in step S101, the second leaked signal output by the second receiving filter may be input into an LNA, and is overlaid with the first leaked signal output from the first receiving filter on the LNA directly, thereby the signals of opposite phases are combined; or the second leaked signal output by the second transmitting filter may be input into the LNA, and then output by the LNA and overlaid with the first leaked signal output by the first receiving filter, thereby the signals of opposite phases are combined.

As revealed in the interference cancellation method in this embodiment, the first transmitted signal is input into the first transmitting filter, the second transmitted signal is input into the second transmitting filter, and the first transmitting filter is symmetric to the second transmitting filter; the interfering signals output from the first transmitting filter and the second transmitting filter may be adjusted to become signals of opposite phases, and are combined. Therefore, the method provided in this embodiment can cancel the interfering signals leaked to the receiving channel, the receiving channel suppresses the transmitted signal effectively, and the interference caused by the transmitted signal onto the received signal is cancelled.

Figure 2:
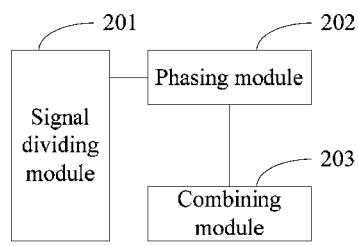
FIG. 2 is a schematic structural diagram of an interference cancellation apparatus according to an embodiment of the present invention.

FIG. 2 is a schematic structural diagram of an interference cancellation apparatus according to an embodiment of the present invention. For ease of description, only the part related to this embodiment of the present invention is illustrated. The interference cancellation apparatus shown in FIG. 2 is applicable to a transceiver in an FDM system, and includes a signal dividing module 201, a phasing module 202, and a combining module 203.

The signal dividing module 201 is configured to divide a transmitted signal into a first transmitted signal and a second transmitted signal, and then input the first transmitted signal into a first transmitting filter and input the second transmitted signal into a second transmitting filter symmetric to the first transmitting filter.

In this embodiment, a transmitted signal refers to a signal output from a digital processing unit of a transceiver, processed by the modules such as digital-to-analog converter, frequency mixer, filter, and amplifier on the transmitting channel, and to be transmitted from antenna port; and a received signal refers to a signal received from the antenna port, to be processed by the modules such as amplifier, filter, frequency mixer, and analog-to-digital converter on the transmitting channel, and to be input into the digital processing unit of the transceiver. The transmitted signal and the received signal share an antenna. Therefore, the band occupied by the transmitted signal (namely, transmitting band) alternates with the band occupied by the received signal (namely, receiving band), or, the passband of the transmitter is the stopband of the receiver, or, the stopband of the transmitter is the passband of the receiver. The transmitting channel refers to a primary channel for the transmitter to transmit signals, and the receiving channel refers to a primary channel for the receiver to receive signals. It should be noted that because the receiving band is a main band occupied by the received signals, the receiving band is generally used to represent the receiving channel, or the receiving channel represents the receiving band; it is the same with the relationship between the transmitting band and the transmitting channel. Due to factors such as non-linearity of devices, when signals are transmitted, part of transmitted signals and/or intermodulation signals derived from the transmitted signals may be leaked to the receiving channel, and cause interference onto the received signals. The suppression of the interference is also known as suppression performed by the receiving channel for the transmitted signals.

Because the size of the FBAR or SAW is small, the transceiver made up of the FBAR or SAW well fulfills the small size requirement imposed by the operator on the communication system. Therefore, in the embodiments of the present invention, the first transmitting filter and the second transmitting filter may be, but are not limited to, the FBAR or SAW. Other filters of a small size, such as BAW, may be used as the first transmitting filter and the second transmitting filter instead. Besides, FBAR, SAW and BAW employ a wafer cutting process, and two adjacent filters or duplexers on the wafer may be set onto the same chip (die or chip) through cutting. In this way, it is easy to ensure consistent electric performance between two filters or duplexers. Moreover, the first transmitting filter is symmetric to the second transmitting filter. For the definition of "symmetric", see the definition given above. That is, symmetry between the first transmitting filter and the second transmitting filter refers to consistent electric performance between the first transmitting filter and the second transmitting filter. The meanings of "consistent electric performance" include: The electric performance is completely the same, or, the impact caused by the difference of the electric performance onto the interference cancellation result is in an acceptable range. The electric performance may include transmission response delay, phase, amplitude, and so on. The structure and features being the same is one of the scenarios of consistent electric performance. That is, symmetry scenarios include the scenario of the structure and features being the same.

The phasing module 202 is configured to adjust a first interfering signal and a second interfering signal to obtain signals of opposite phases, where the first interfering signal includes a signal leaked from the first transmitted signal to a receiving channel after the first transmitted signal flows through the first transmitting filter and a first receiving filter, the second interfering signal includes a signal leaked from the second transmitted signal after the second transmitted signal flows through the second transmitting filter and a second receiving filter, and the receiving channel is a primary channel for a receiver to receive signals.

In this embodiment, after the transmitted signal is output from the divider, or is coupled into the transmitting filter or the receiving filter, although a majority of the signal passes through the transmitting filter and is finally sent from the antenna port, a part of the transmitted signal still passes through the receiving filter and flows back to the receiving channel. The signal that flows back to the receiving channel includes not only the transmitted signal not filtered out by the receiving filter, but also the intermodulation signal derived from the transmitted signal. For example, in this embodiment, the first interfering signal includes the signal leaked from the first transmitted signal to the receiving channel after the first transmitted signal flows through the first transmitting filter and the first receiving filter, and may be a part of the first transmitted signal leaked to the receiving channel and/or the intermodulation signal derived from the first transmitted signal. On the route of the signal, the signal is output from the first transmitting filter to the first receiving filter, and then output from the first receiving filter; or the signal is output from the first receiving filter, passes through other modules (such as phase regulator), enters the first transmitting filter, and then is output from the first transmitting filter. The second leaked signal includes the signal leaked from the second transmitted signal to the receiving channel after the second transmitted signal flows through the second transmitting filter and the second receiving filter, and may be a part of the second transmitted signal leaked to the receiving channel and/or the intermodulation signal derived from the second transmitted signal. On the route of the signal, the signal is output from the second transmitting filter to the second receiving filter, and then is output from the second receiving filter.

The combining module 203 is configured to combine the signals of opposite phases.

In the interference cancellation apparatus embodiment above, the deployment of the function modules is for the exemplary purpose only. In practical application, depending on the requirements such as hardware configuration requirements or software implementation convenience, the aforementioned functions may be implemented by different function modules. That is, the internal structure of the interference cancellation apparatus is divided into different function modules to undertake all or part of the functions described above. Moreover, in practical application, the corresponding function modules in this embodiment may be corresponding hardware or corresponding software executed by the hardware. For example, the signal dividing module may be hardware capable of dividing the transmitted signal into the first transmitted signal and the second transmitted signal and inputting the signals into the first transmitting filter and the second transmitting filter symmetric to the first transmitting filter, such as a signal divider, or a general processor capable of executing the corresponding computer program to implement such function, or another hardware device; the phasing module may be hardware capable of adjusting the first interfering signal and the second interfering signal to make opposite phases of signals, such as phase regulator, or a general processor capable of executing the corresponding computer program to implement such a function, or another hardware device (the principles described here are applicable to all embodiments of the present invention).

Figure 3:
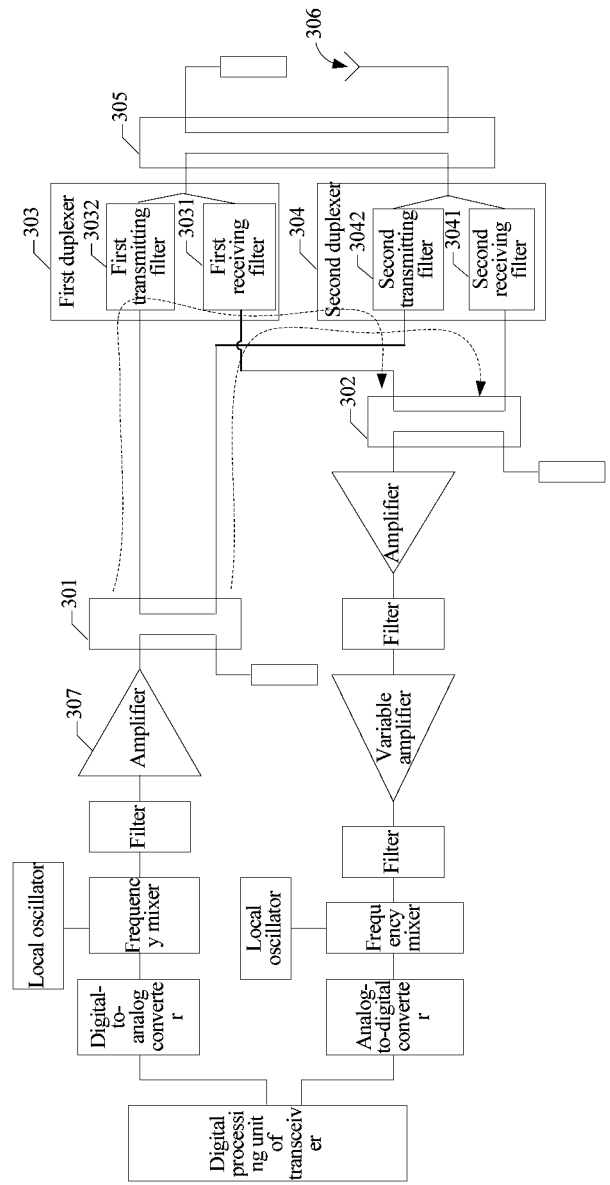
FIG. 3 is a schematic structural diagram of an interference cancellation apparatus according to another embodiment of the present invention.

Specifically, the signal dividing module 201 shown in FIG. 2 may be a divider or includes a divider, such as a 90° divider or 3 dB bridge; the phasing module 202 is specifically a 90° combiner or includes a 90° combiner. As shown in FIG. 3, an interference cancellation apparatus provided in another embodiment of the present invention includes a divider 301, a first 90° combiner 302, a first duplexer 303, a second duplexer 304, and a second 90° combiner 305. The first duplexer 303 and the second duplexer 304 are connected with the second 90° combiner 305, and the second 90° combiner 305 is connected with the antenna 306.

To keep the same temperature feature, in this embodiment, the first duplexer 303 and the second duplexer 304 may be integrated on the same substrate such as a silicon wafer semiconductor substrate; the first duplexer 303 and the second duplexer 304 that are integrated on the same substrate may be an FBAR or SAW, or may be a BAW; the first duplexer 303 includes a first receiving filter 3031 and a first transmitting filter 3032, and the second duplexer 304 includes a second receiving filter 3041 and a second transmitting filter 3042; and the symmetry between the first duplexer 303 and the second duplexer 304 includes symmetry between the first transmitting filter 3032 and the second transmitting filter 3042, or includes symmetry between the first transmitting filter 3032 and the second transmitting filter 3042, and symmetry between the first receiving filter 3031 and the second receiving filter 3041. For the definition of "symmetry" or "symmetric", see the definition above. That is, symmetry between the first transmitting filter and the second transmitting filter refers to consistent electric performance between the first transmitting filter and the second transmitting filter, and symmetry between the first receiving filter and the second receiving filter refers to consistent electric performance between the first receiving filter and the second receiving filter. The meanings of "consistent electric performance" include: The electric performance is completely the same, or, the impact caused by the difference of the electric performance onto the interference cancellation result is in an acceptable range. The electric performance may include transmission response delay, phase, amplitude, and so on. The structure and features being the same is one of the scenarios of consistent electric performance. That is, symmetry scenarios include the scenario of the structure and features being the same.

In the interference cancellation apparatus shown in FIG. 3, the transmitted signal passes through the devices such as digital processing unit of the transceiver, digital-to-analog converter, frequency mixer, filter 307, and amplifier, and enters the divider 301. At the divider 301, the transmitted signal is divided into two signals with a phase difference of 90°, for example, a first transmitted signal whose phase is 90° (or 0°) and a second transmitted signal whose phase is 180° (or 90°). Each transmitted signal includes not only the transmitted signal itself, but also an intermodulation signal. The intermodulation signal is derived from the transmitted signal due to nonlinearity of the devices such as the amplifier 307. The first transmitted signal is input into the first duplexer 303, and the second transmitted signal is input into the second duplexer 304. After the first transmitting signal is input into the first duplexer 303, although a majority of the signal passes through the first transmitting filter 3032 and is input to the second 90° combiner 305 connected with the first duplexer 303, a part of the signal (including a part of the first transmitted signal and the intermodulation signal derived from the first transmitted signal) still passes through the first receiving filter 3031 and the first 90° combiner 302, and leaks to the receiving channel. Such signals are the first interfering signal that travels along the following route: The signal is output from the first transmitting filter 3032 to the first receiving filter 3031, and then output from the first receiving filter 3031 to the first 90° combiner 302. The dotted line in FIG. 3 shows the route of the interfering signal. Similarly, after the second transmitting signal is input into the second duplexer 304, although a majority of the signal passes through the second transmitting filter 3042 in the second duplexer and is input to the second 90° combiner 305 connected with the second duplexer 304, a part of the signal (including a part of the second transmitted signal and the intermodulation signal derived from the second transmitted signal) still passes through the second receiving filter 3041 and the first 90° combiner 302, and leaks to the receiving channel. Such signals are the second interfering signal that travels along the following route: The signal is output from the second transmitting filter 3042 to the second receiving filter 3041, and then output from the second receiving filter 3041 to the first 90° combiner 302. The dotted line in FIG. 3 shows the route of the interfering signal. If the interfering signal leaked to the receiving channel is not cancelled, the interfering signal will cause interference to the received signal transmitted from the first receiving filter 3031 and the second receiving filter 3041.

In the interference cancellation apparatus shown in FIG. 3, the second 90° combiner 305 performs 90° combination for the first transmitted signal output by the first transmitting filter 3032 and the second transmitted signal output by the second transmitting filter 3042, and then outputs the combined signal from the antenna 306 connected with the combiner. In this way, the power or energy of the transmitted signal suffers little loss.

Understandably, at the time of receiving signals, the second 90° combiner 305 performs 90° division for the received signal, and inputs the divided signals to the first duplexer 303 and the second duplexer 304 respectively. Due to the filtering effect of the first transmitting filter 3032 and the second transmitting filter 3042 (the stopband of the transmitting filter overlaps the passband of the receiving filter), the received signal output from the second 90° combiner 305 is input from the first receiving filter 3031 and the second receiving filter 3041 respectively, and then output from the first 90° combiner 302 to the receiving channel, instead of being input from the first transmitting filter 3032 and the second transmitting filter 3042 and then output from the first 90° combiner 302 to the transmitting channel.

The first interfering signal output from the first receiving filter 3031 and the second interfering signal output from the second receiving filter 3041 undergo 90° phase shift at the 90° combiner 302 and are input to a low noise amplifier 307. The first transmitting filter 3032 is symmetric to the second transmitting filter 3042, and the difference between the phase of the first transmitted signal and the phase of the second transmitted signal is 90° after the signals pass through the divider 301. Therefore, after the 90° combiner 302 performs 90° phase shift for the part of the first transmitted signal output from the first receiving filter 3031 and the part of the second transmitted signal output from the second receiving filter 3041, and before the signals are input to the low noise amplifier 307, the phase difference is 180°, namely, the two have opposite phases. That is to say, the two signals are cancelled or basically cancelled when being combined at the 90° combiner 302, and no interference is caused to the received signal on the receiving channel. Due to the outband filter feature of the transmitting filter, the transmitting filter is unable to filter out outband signals completely. The intermodulation signal output from the first receiving filter 3031, derived from the first transmitted signal, and occupying a band that overlaps the receiving band (namely, the band occupied by the received signal) is compared with the intermodulation signal output from the second receiving filter 3041, derived from the second transmitted signal, and occupying a band that overlaps the receiving band, and the comparison shows that the phase difference between the two intermodulation signals is 90°. Therefore, after the 90° combiner 302 performs 90° phase shift for the two intermodulation signals, the final phase difference is 180°, namely, the two have opposite phases.

Further, the first receiving filter 3031 may also be symmetric to the second receiving filter 3041. In this way, the inconsistency of the outband filter feature of the receiving filter is overcome, and the effect of interference cancellation is strengthened. When the first receiving filter 3031 is symmetric to the second receiving filter 3041, the relationship between the part of the first transmitted signal output from the first receiving filter 3031 of the first duplexer 303 and the part of the second transmitted signal output from the second receiving filter 3041 of the second duplexer 304 is similar to the relationship applicable when the first transmitting filter 3032 is symmetric to the second transmitting filter 3042, namely, after the 90° combiner 302 performs 90° phase shift, the final phase difference is 180°, namely, the two have opposite phases. The intermodulation signal output from the first receiving filter 3031, derived from the first transmitted signal, and occupying a band that overlaps the transmitting band (and/or overlaps no receiving band) is compared with the intermodulation signal output from the second receiving filter 3041, derived from the second transmitted signal, and occupying a band that overlaps the transmitting band and/or overlaps no receiving band, and the comparison shows that the phase difference between the two intermodulation signals is 90°. Therefore, after the 90° combiner 302 performs 90° phase shift for the two intermodulation signals, the final phase difference is 180°, namely, the two have opposite phases.

Figure 4A:
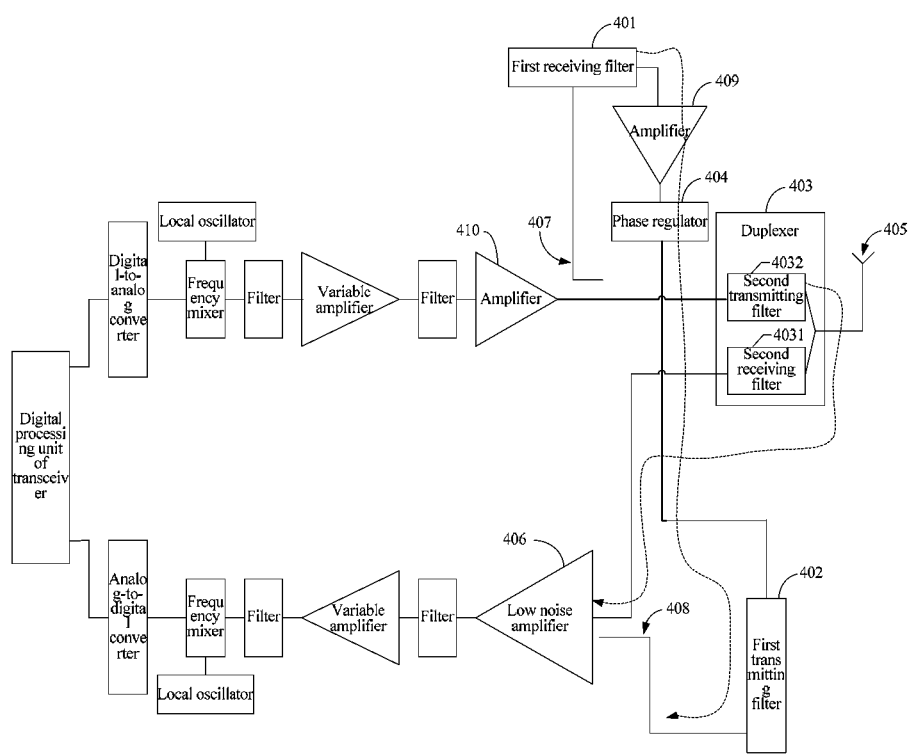
FIG. 4a is a schematic structural diagram of an interference cancellation apparatus according to another embodiment of the present invention.

Specifically, the signal dividing module 201 shown in FIG. 2 may be a coupler or includes a coupler; the phasing module 202 is specifically a phase regulator or includes a phase regulator. As shown in FIG. 4a, an interference cancellation apparatus provided in another embodiment of the present invention includes a first receiving filter 401, a first transmitting filter 402, a duplexer 403, a phase regulator 404, a first coupler 407, a second coupler 408, an amplifier 409 and so on. The duplexer 403 is connected with the antenna 405, and the first transmitting filter 402 is not connected with the antenna 405. The duplexer 403 includes a second receiving filter 4031 and a second transmitting filter 4032. To keep the same temperature feature, in this embodiment, the first receiving filter 401, the first transmitting filter 402, and the duplexer 403 may be integrated on the same substrate such as a silicon wafer semiconductor substrate; the first receiving filter 401, the first transmitting filter 402, and the duplexer 403 integrated on the same substrate may be an FBAR or SAW, or may be a BAW. The first transmitting filter 402 is symmetric to the second transmitting filter 4032 of the duplexer 403; or, the first transmitting filter 402 is symmetric to the second transmitting filter 4032 of the duplexer 403, and the first receiving filter 401 is symmetric to the second receiving filter 4031 of the duplexer 403. For the definition of "symmetry" or "symmetric", see the definition above. That is, symmetry between the first transmitting filter and the second transmitting filter of the duplexer refers to consistent electric performance between the first transmitting filter and the second transmitting filter of the duplexer, and symmetry between the first receiving filter and the second receiving filter of the duplexer refers to consistent electric performance between the first receiving filter and the second receiving filter of the duplexer. The meanings of "consistent electric performance" include: The electric performance is completely the same, or, the impact caused by the difference of the electric performance onto the interference cancellation result is in an acceptable range. The electric performance may include transmission response delay, phase, amplitude, and so on. The structure and features being the same is one of the scenarios of consistent electric performance. That is, symmetry scenarios include the scenario of the structure and features being the same.

The first coupler 407 couples a part of the transmitted signal out of the amplifier, and inputs the signal as a first transmitted signal into the first receiving filter 401; the first receiving filter 401 filters the first transmitted signal and inputs it into the phase regulator 404; finally, the phase regulator 404 performs 180° phase regulation for the signal, and inputs the signal into the first transmitting filter 402. Although the first transmitted signal is filtered by the first receiving filter 401, a part of the first transmitted signal and the intermodulation signal derived from the first transmitted signal are still not filtered out by the first receiving filter 401. Such signals that are not filtered out make up the first interfering signal. The first interfering signal is output from the first receiving filter 401 to the phase regulator 404, and then input into the first transmitting filter 402, and finally output from the first transmitting filter 402. The dotted line in FIG. 4a shows the route of the leaked interfering signal.

The part not coupled by the first coupler 407 in the transmitted signal, namely, the transmitted signal not coupled by the first coupler 407, is output as a second transmitted signal to the duplexer 403. Although the second transmitting filter 4032 in the duplexer 403 can transmit a majority of the second transmitted signal to the antenna 405 and then the antenna 405 transmits the signal, a part of the second transmitted signal and the intermodulation signal derived from the second transmitted signal are still not filtered out by the second receiving filter 4031 and are leaked to the receiving channel. Such signals that are not filtered out make up the second interfering signal. The second interfering signal is output from the second receiving filter 4031 to the second transmitting filter 4032, and finally output from the second transmitting filter 4032. The dotted line in FIG. 4a shows the route of the leaked interfering signal.

Unlike the interference cancellation apparatus shown in FIG. 3, in the interference cancellation apparatus shown in FIG. 4a, after the transmitted signal is output from the amplifier 410, a majority of the transmitted signal is input to the second transmitting filter 4032 of the duplexer, and the coupler 407 couples only a very small part of the transmitted signal and inputs it to the first receiving filter 401. The first transmitted signal output from the first receiving filter 401 is coupled by the coupler, and its power or energy is small; the power or energy of the second transmitted signal output by the second transmitting filter 4032 is far greater than the power or energy of the first transmitted signal. Therefore, even if no cancellation apparatus shown in FIG. 3 combines the second transmitted signal output by the second transmitting filter 4032 with the first transmitted signal output by the first transmitting filter 402, the power or energy of the transmitted signal output by the amplifier 410 suffers no great loss, or the lost energy or power is ignorable.

Understandably, at the time of receiving signals, after the signal received from the antenna 405 is input into the duplexer 403, due to the filtering effect of the second transmitting filter 4032 (the stopband of the transmitting filter basically overlaps the passband of the receiving filter), the received signal is input from the second receiving filter 4031 and then output by the low noise amplifier 406 to the receiving channel, instead of being input from the second transmitting filter 4032 and then output by the amplifier 410 to the transmitting channel.

The first interfering signal undergoes 180° phase shift performed by the phase regulator 404, and is then input to the first transmitting filter 402. The first transmitting filter 402 is symmetric to the second transmitting filter 4032, and the phase of the signal output from the first transmitting filter 402 is the same as the phase of the first transmitted signal output by the phase regulator 404 after the 180° phase shift, and therefore, the phase difference between the part of the first transmitted signal output from the first transmitting filter 402 and the part of the second transmitted signal output from the second receiving filter 4031 is 180°, namely, the two have opposite phases. Due to the outband filter feature of the transmitting filter, the transmitting filter is unable to filter out outband signals completely. The phase of the intermodulation signal, which is output from the first transmitting filter 402, derived from the first transmitted signal, and occupying a band that overlaps the receiving band (namely, the band occupied by the received signal), is the same as the phase of the intermodulation signal output by the phase regulator 404 after the 180° phase shift. Therefore, the intermodulation signal output from the first transmitting filter 402, derived from the first transmitted signal, and occupying a band that overlaps the receiving band is compared with the intermodulation signal output from the second receiving filter 4031, derived from the second transmitted signal, and occupying a band that overlaps the receiving band, and the comparison shows that the phase difference is 180°, namely, the two have opposite phases.

Further, the first receiving filter 401 may also be symmetric to the second receiving filter 4041. In this way, the inconsistency of the outband filter feature of the receiving filter is overcome, and the effect of interference cancellation is strengthened. When the first receiving filter 401 is symmetric to the second receiving filter 4031, the relationship between the part of the first transmitted signal output from the first transmitting filter 402 and the part of the second transmitted signal output from the second receiving filter 4031 is similar to the relationship applicable when the first transmitting filter 402 is symmetric to the second transmitting filter 4032, namely, after the phase regulator performs the 180° phase shift, the final phase difference is 180°, namely, the two have opposite phases. The phase of the intermodulation signal, which is output from the first transmitting filter 402, derived from the first transmitted signal, and occupying a band that overlaps the transmitting band (and/or overlaps no receiving band), is the same as the phase of the intermodulation signal output after the signal undergoes the 180° phase shift performed by the phase regulator. Therefore, the intermodulation signal output from the first transmitting filter 402, derived from the first transmitted signal, and occupying a band that overlaps the transmitting band (and/or overlaps no receiving band) is compared with the intermodulation signal output from the second receiving filter 4031, derived from the second transmitted signal, and occupying a band that overlaps the transmitting band (and/or overlaps no receiving band), and the comparison shows that the phase difference is 180°, namely, the two have opposite phases.

Figure 4B:
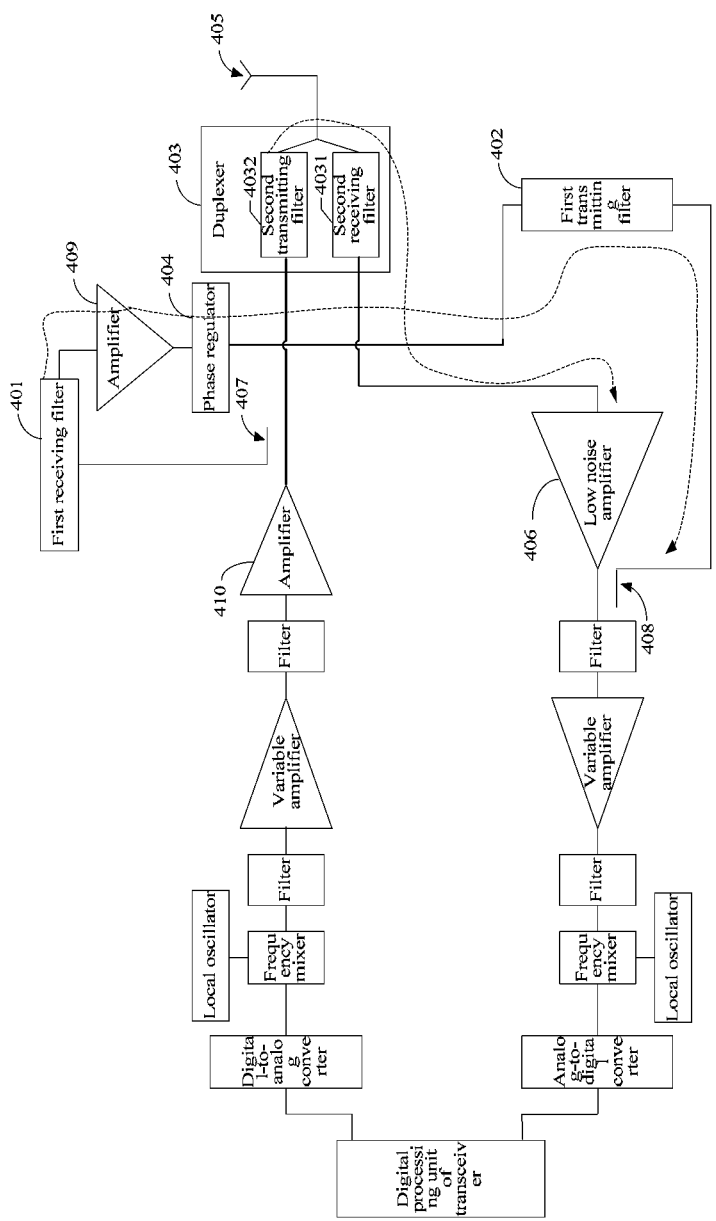
FIG. 4b is a schematic structural diagram of an interference cancellation apparatus according to another embodiment of the present invention.

For two signals of opposite phases, through the interference cancellation apparatus shown in FIG. 4a, the second interfering signal output by the second receiving filter 4031 and the first interfering signal coupled by the second coupler 408 from the first transmitting filter 402 are input into the low noise amplifier 406, and then the low noise amplifier 406 overlay the signals directly, thereby the signals of opposite phases are combined. Alternatively, through the interference cancellation apparatus shown in FIG. 4b, the second interfering signal output by the second receiving filter 4031 is input into the low noise amplifier 406, and then the signal is output by the low noise amplifier 406 and coupled by the second coupler 408 with the first interfering signal output from the first transmitting filter 402, thereby the signals of opposite phases are combined. Combining the signals of opposite phases means that the two signals are cancelled or basically cancelled, and no interference is caused to the received signal on the receiving channel, namely, the suppression performed by the transmitting side for the receiving side is reduced.

Figure 5A:
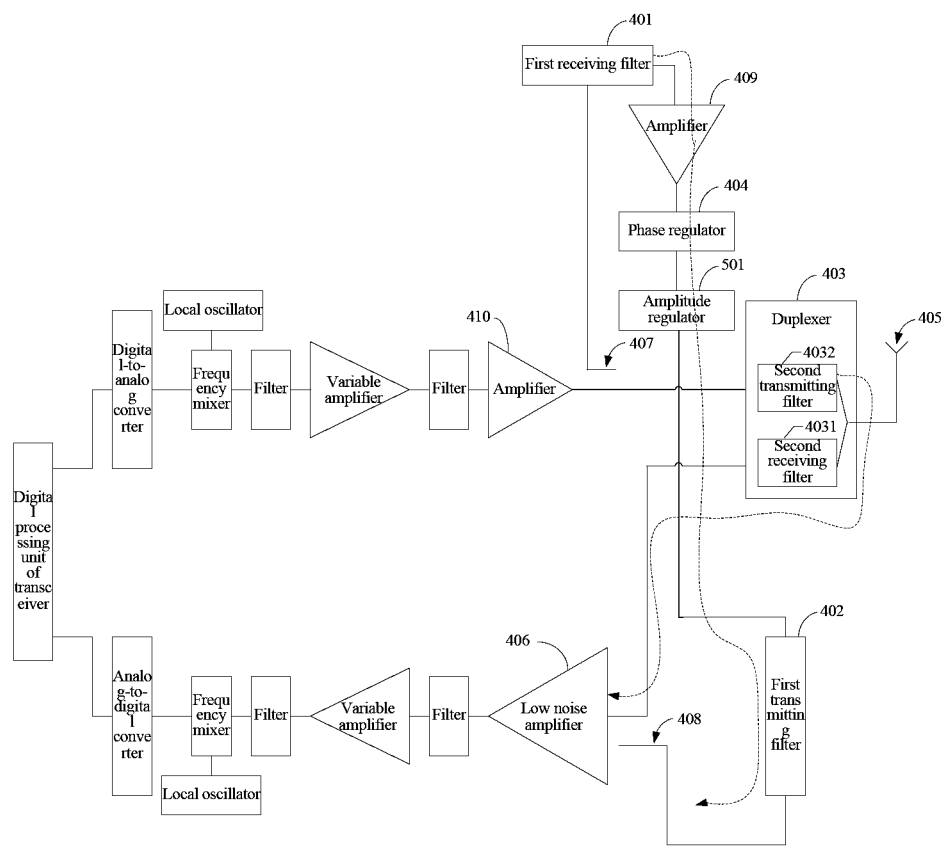
FIG. 5a is a schematic structural diagram of an interference cancellation apparatus according to another embodiment of the present invention.
Figure 5B:
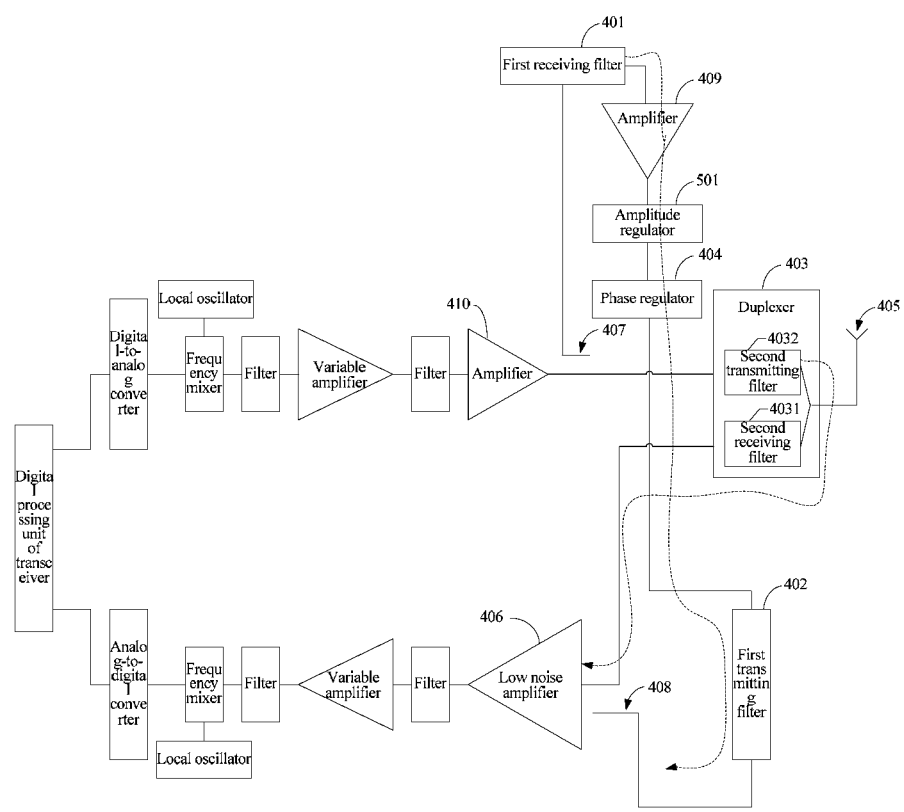
FIG. 5b is a schematic structural diagram of an interference cancellation apparatus according to another embodiment of the present invention.

To accomplish a better effect of interference cancellation, the amplitude of the first interfering signal may be adjusted before, when, or after the first interfering signal output from the first receiving filter 401 is input into the phase regulator 404 for undergoing the 180° phase shift. Specifically, the amplitude of the first interfering signal is adjusted as equal to the amplitude of the second interfering signal. That is, the phasing module 202 shown in FIG. 2 may be an amplitude phase regulator, which includes an amplitude regulator 501. FIG. 5a or FIG. 5b shows an interference cancellation apparatus provided in another embodiment of the present invention. The amplitude regulator 501 is connected with the phase regulator 404 or the first receiving filter 401, and is configured to adjust the amplitude of the first interfering signal so that the amplitude of the first interfering signal is equal to the amplitude of the second interfering signal. In this way, after the phase regulator 404 performs the 180° phase shift for the first interfering signal, if the first interfering signal is combined with the second interfering signal, the two interfering signals are completely cancelled.

Figure 6A:
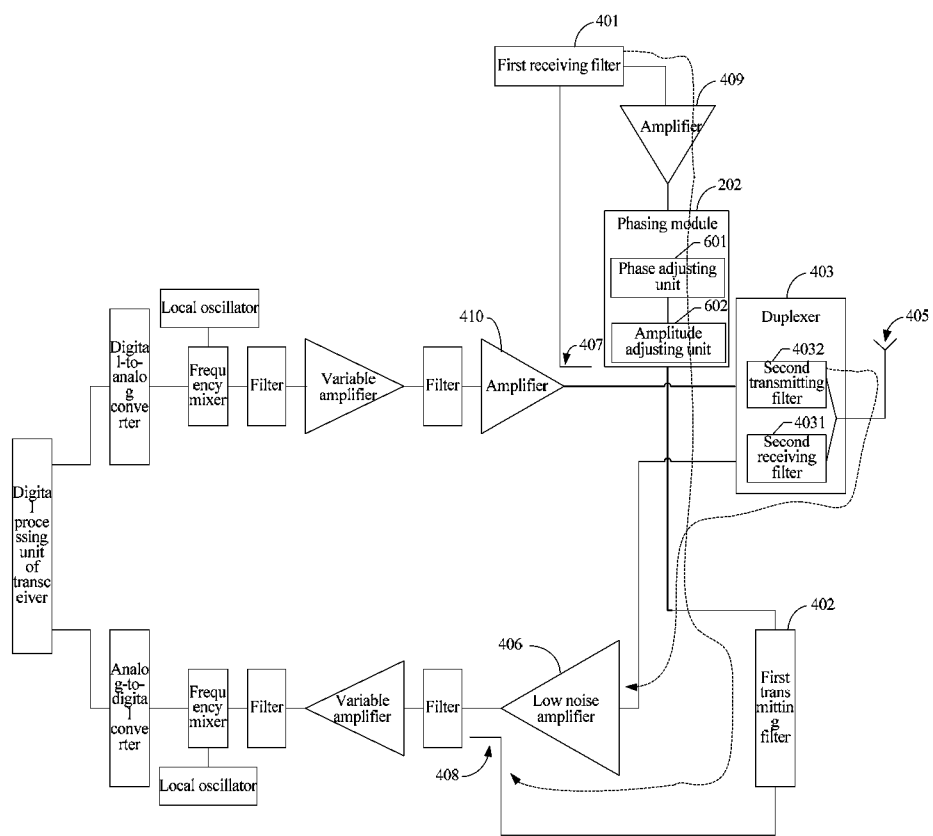
FIG. 6a is a schematic structural diagram of an interference cancellation apparatus according to another embodiment of the present invention.
Figure 6B:
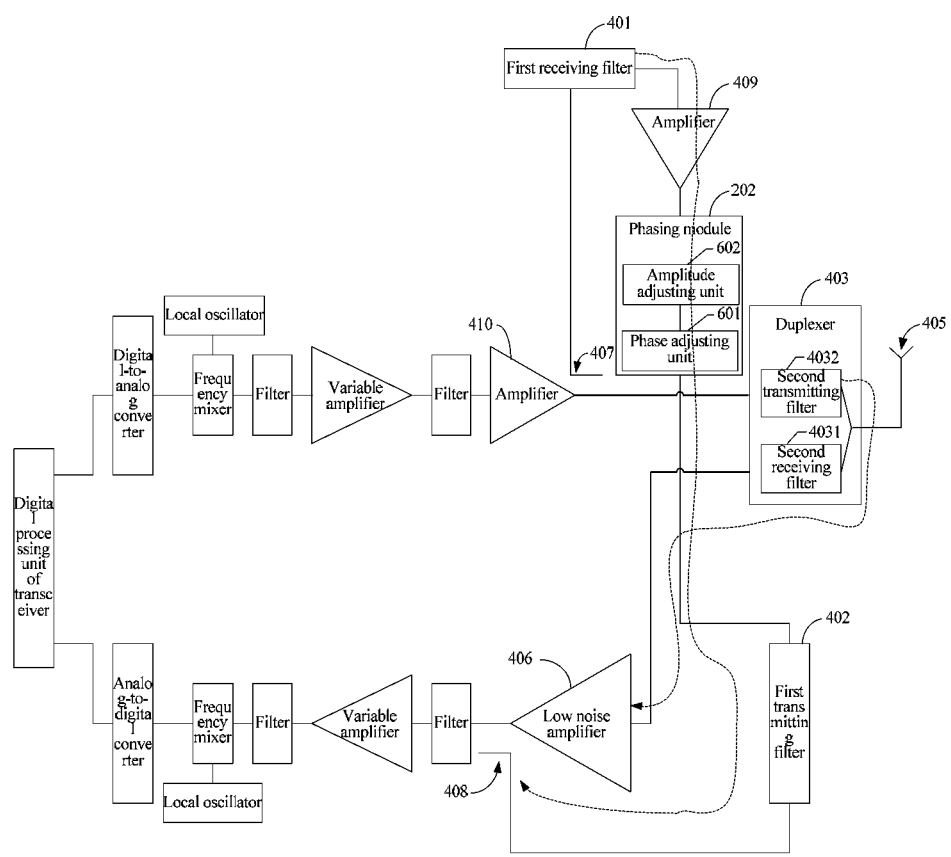
FIG. 6b is a schematic structural diagram of an interference cancellation apparatus according to another embodiment of the present invention.

In another embodiment of the present invention, the phasing module 202 includes a phase adjusting unit 601 and an amplitude adjusting unit 602, as shown in the interference cancellation apparatus in FIG. 6a or FIG. 6b. The phase adjusting unit 601 is configured to perform 180° phase shift for the first interfering signal output by the first receiving filter 401, and then input the signal to the amplitude adjusting unit 602. The amplitude adjusting unit 602 is configured to adjust the amplitude of the first interfering signal so that the amplitude of the first interfering signal is equal to the amplitude of the second interfering signal. The amplitude adjusting unit 602 inputs the first interfering signal that has undergone amplitude adjustment into the first transmitting filter 402; or the amplitude adjusting unit 602 is configured to adjust the amplitude of the first interfering signal output by the first receiving filter 401 so that the amplitude of the first interfering signal is equal to the amplitude of the second interfering signal output by the second receiving filter 402. The amplitude adjusting unit 602 outputs the first interfering signal that has undergone amplitude adjustment to the phase adjusting unit 601, and then the phase adjusting unit 601 performs 180° phase shift for the first interfering signal output by the amplitude adjusting unit 602 and inputs the signal to the first transmitting filter 402. In this way, the first interfering signal and the second interfering signal are completely cancelled after the two interfering signals of equal amplitudes and opposite phases are combined.

Further, a base station is provided in an embodiment of the present invention. The base station may include the interference cancellation apparatus provided in any embodiment shown in FIG. 2 to FIG. 6b. Further, a communication system is provided in an embodiment of the present invention, for example, an FDM system. The communication system may include the base station provided in an embodiment of the present invention.

Figure 7:
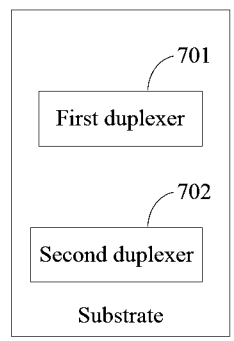
FIG. 7 is a schematic structural diagram of a filter according to an embodiment of the present invention.
Figure 8:
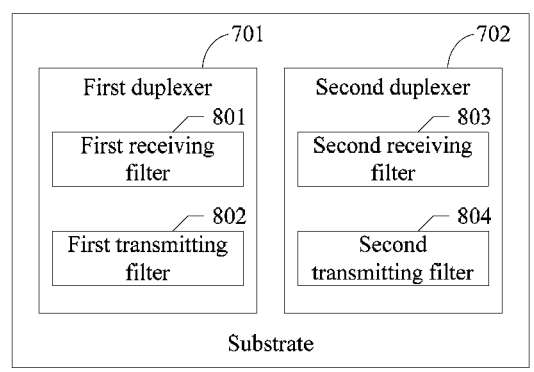
FIG. 8 is a schematic structural diagram of a filter according to another embodiment of the present invention.

FIG. 7 is a schematic structural diagram of a filter (filter device) according to an embodiment of the present invention. For ease of description, only the part related to this embodiment of the present invention is illustrated. The filter shown in FIG. 7 includes a first duplexer 701 and a second duplexer 702 symmetric to the first duplexer 701. FIG. 8 shows a filter provided in another embodiment of the present invention. The first duplexer shown in FIG. 7 further includes a first receiving filter 801 and a first transmitting filter 802. The second duplexer 702 includes a second receiving filter 803 and a second transmitting filter 804. The first transmitting filter 802 is symmetric to the second transmitting filter 804; or, the first receiving filter 801 is symmetric to the second receiving filter 803 and the first transmitting filter 802 is symmetric to the second transmitting filter 804. For the definition of "symmetry" or "symmetric", see the definition above. That is, symmetry between the first transmitting filter and the second transmitting filter refers to consistent electric performance between the first transmitting filter and the second transmitting filter, and symmetry between the first receiving filter and the second receiving filter refers to consistent electric performance between the first receiving filter and the second receiving filter. The meanings of "consistent electric performance" include: The electric performance is completely the same, or, the impact caused by the difference of the electric performance onto the interference cancellation result is in an acceptable range. The electric performance may include transmission response delay, phase, amplitude, and so on. The structure and features being the same is one of the scenarios of consistent electric performance. That is, symmetry scenarios include the scenario of the structure and features being the same.

To keep the same temperature feature, the first duplexer 701 and the second duplexer 702 shown in FIG. 7 or FIG. 8 may be integrated on the same substrate such as a silicon wafer semiconductor substrate. Besides, the first duplexer and the second duplexer may also be integrated on the same chip (die or chip), or integrated in the same package, or integrated in the same module so as to accomplish consistent electric performance between the first transmitting filter of the first duplexer and the second transmitting filter of the second duplexer, or, further, accomplish consistent electric performance between the first receiving filter of the first duplexer and the second receiving filter of the second duplexer. In all embodiments of the present invention, it is assumed that the first transmitting filter and the second transmitting filter are integrated on the same substrate. Understandably, "keep the same temperature feature" mentioned above also aims to accomplish better symmetry of the filters, namely, accomplish better consistency of electric performance between the first transmitting filter and the second transmitting filter, or, further, accomplish better consistency of electric performance between the first receiving filter and the second receiving filter. Alternatively, in the filter device, the first transmitting filter and the second transmitting filter are integrated on the same chip, or integrated on the same substrate, or integrated in the same package, or integrated in the same module.

Figure 9:
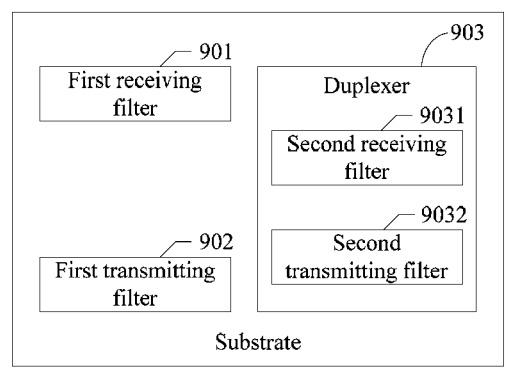
FIG. 9 is a schematic structural diagram of a filter according to another embodiment of the present invention.

FIG. 9 is a schematic structural diagram of filter (filter device) according to an embodiment of the present invention. For ease of description, only the part related to this embodiment of the present invention is illustrated. The filter shown in FIG. 9 includes a first receiving filter 901, a first transmitting filter 902, and a duplexer 903. The duplexer 903 includes a second receiving filter 9031 and a second transmitting filter 9032, where the first transmitting filter 902 is symmetric to the second transmitting filter 9032; or, the first receiving filter 901 is symmetric to the second receiving filter 9031 and the first transmitting filter 902 is symmetric to the second transmitting filter 9032. For the definition of "symmetry" or "symmetric", see the definition above. That is, symmetry between the first transmitting filter and the second transmitting filter refers to consistent electric performance between the first transmitting filter and the second transmitting filter, and symmetry between the first receiving filter and the second receiving filter refers to consistent electric performance between the first receiving filter and the second receiving filter. The meanings of "consistent electric performance" include: The electric performance is completely the same, or, the impact caused by the difference of the electric performance onto the interference cancellation result is in an acceptable range. The electric performance may include transmission response delay, phase, amplitude, and so on. The structure and features being the same is one of the scenarios of consistent electric performance. That is, symmetry scenarios include the scenario of the structure and features being the same.

To keep the same temperature feature, the first receiving filter 901, the first transmitting filter 902, and the duplexer 903 shown in FIG. 9 may be integrated on the same substrate such as a silicon wafer semiconductor substrate. Besides, the symmetry between the first receiving filter, the first transmitting filter, and the duplexer inclusive of the second receiving filter and the second transmitting filter may also be integrated on the same chip (die or chip), or integrated in the same package, or integrated in the same module so as to accomplish consistent electric performance between the first transmitting filter and the second transmitting filter in the duplexer, or, further, accomplish consistent electric performance between the first receiving filter and the second receiving filter in the duplexer. In all embodiments of the present invention, it is assumed that the first transmitting filter and the second transmitting filter are integrated on the same substrate. Understandably, "keep the same temperature feature" mentioned above also aims to accomplish better symmetry of the filters, namely, accomplish better consistency of electric performance between the first transmitting filter and the second transmitting filter in the duplexer, or, further, accomplish better consistency of electric performance between the first receiving filter and the second receiving filter in the duplexer. Alternatively, in the filter device, the second transmitting filter of the duplexer and the first transmitting filter are integrated on the same chip, or integrated on the same substrate, or integrated in the same package, or integrated in the same module.

Further, a filter device is provided in an embodiment of the present invention. The filter device includes a first transmitting filter and a second transmitting filter, where the first transmitting filter is symmetric to the second transmitting filter. Further, the first transmitting filter and the second transmitting filter may be integrated on the same chip (die or chip), or integrated on the same substrate, or integrated in the same package, or integrated in the same module, so as to accomplish consistent electric performance between the first transmitting filter and the second transmitting filter.

Further, a filter device is provided in an embodiment of the present invention. The filter device includes a first receiving filter and a second receiving filter, where the first receiving filter is symmetric to the second receiving filter. Further, the first receiving filter and the second receiving filter may be integrated on the same chip (die or chip), or integrated on the same substrate, or integrated in the same package, or integrated in the same module, so as to accomplish consistent electric performance between the first receiving filter and the second receiving filter.

Further, a filter device is provided in an embodiment of the present invention. The filter device includes a first transmitting filter and a second transmitting filter. The first transmitting filter and the second transmitting filter are integrated on the same chip, or integrated on the same substrate, or integrated in the same package, or integrated in the same module.

Further, a filter device is provided in an embodiment of the present invention. The filter device includes a first receiving filter and a second receiving filter. The first receiving filter and the second receiving filter are integrated on the same chip, or integrated on the same substrate, or integrated in the same package, or integrated in the same module.

Further, a filter device is provided in an embodiment of the present invention. The filter device includes a first duplexer and a second duplexer. The first duplexer and the second duplexer are integrated on the same chip, or integrated on the same substrate, or integrated in the same package, or integrated in the same module.

Further, a filter device is provided in an embodiment of the present invention. The filter device includes a first receiving filter, a first transmitting filter, and a duplexer. The duplexer, the first receiving filter, and the first transmitting filter are integrated on the same chip, or integrated on the same substrate, or integrated in the same package, or integrated in the same module.

Understandably, in the foregoing embodiments of the present invention, a transmitted signal refers to a signal output from a digital processing unit of a transceiver, processed by the modules such as digital-to-analog converter, frequency mixer, filter, and amplifier on the transmitting channel, and to be transmitted from antenna port; and a received signal refers to a signal received from the antenna port, to be processed by the modules such as amplifier, filter, frequency mixer, and analog-to-digital converter on the transmitting channel, and to be input into the digital processing unit of the transceiver. However, the transmitted signal in the embodiments of the present invention is not limited to the transmitted signal at the antenna port, but may be the signal at any position in the transmitting channel, for example, the signal before the amplifier. Nevertheless, to accomplish a better effect of interference cancellation, before the coupled transmitted signal (the first transmitted signal) is input into the first transmitting filter, the first transmitted signal may pass the same devices as those passed by the transmitted signal not coupled (the second transmitted signal), namely, flows along the same route. In this way, although more devices need to be added to cancel interference, the similar effect is accomplished. However, considering the cost, if a device is not very influential in processing signals or accomplishing a better effect of interference cancellation, the device may be omitted in the route existent before the first transmitted signal is input into the first transmitting filter. Besides, the location of combining two interfering signals is not limited to the antenna port described in the embodiments above, but may be any position in the receiving channel. Nevertheless, to accomplish a better effect of interference cancellation, after the coupled transmitted signal (the first transmitted signal) is output from a interference cancellation filtering unit (such as the first duplexer, or the first receiving filter and the first transmitting filter) (the output signal is the first interfering signal), the first interfering signal is processed by the same devices in the receiving channel as those that handle the transmitted signal not coupled (the second transmitted signal) and output by the second duplexer (the output signal is the second interfering signal), and then the two interfering signals are combined. However, considering the cost, if a device is not very influential in processing signals or accomplishing a better effect of interference cancellation, the device may be omitted in the route existent before the first interfering signal and the second interfering signal are combined. Such variations do not affect implementation or protection of the present invention.

As regards the information exchange between the modules/units in the apparatus above as well as the implementation processes, because they are based on the same conception as the method embodiment of the present invention and bring the same technical effects as the method embodiment, they are not repeated here any further. For details, see the description in the method embodiments above.

Persons skilled in the art understand that all or part of various methods in the foregoing embodiments of the present invention may be implemented by a program instructing relevant hardware, for example, one of or some of or all of the following methods:

dividing a transmitted signal into a first transmitted signal and a second transmitted signal, and then inputting the first transmitted signal into a first transmitting filter and inputting the second transmitted signal into a second transmitting filter symmetric to the first transmitting filter;

adjusting a first interfering signal and a second interfering signal to obtain signals of opposite phases, where the first interfering signal includes a signal leaked from the first transmitted signal to a receiving channel after the first transmitted signal flows through the first transmitting filter and a first receiving filter, the second interfering signal includes a signal leaked from the second transmitted signal to the receiving channel after the second transmitted signal flows through the second transmitting filter and a second receiving filter, and the receiving channel is a channel for a receiver to receive signals; and combining the signals of opposite phases.

Persons skilled in the art understand that all or part of the steps of the methods in the embodiments of the present invention may be implemented by a program instructing relevant hardware. The program may be stored in a computer readable storage medium, and the storage medium may be a read-only memory (ROM, Read Only Memory), random access memory (RAM, Random Access Memory), magnetic disk, CD-ROM, and so on.

Detailed above are an interference cancellation method and apparatus and also a filter according to embodiments of the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. An interference cancellation method, comprising:
dividing a transmitted signal into a first transmitted signal and a second transmitted signal, and then inputting the first transmitted signal into a first transmitting filter and inputting the second transmitted signal into a second transmitting filter symmetric to the first transmitting filter;
adjusting a first interfering signal and a second interfering signal to obtain signals of opposite phases,
wherein the first interfering signal comprises at least one of the following:
(a) a part of the first transmitted signal which is leaked from the first transmitted signal into a receiving channel after the first transmitted signal flows through the first transmitting filter and a first receiving filter, and
(b) an intermodulation signal derived from the first transmitted signal,
wherein the second interfering signal comprises at least one of the following:
(c) a part of the second transmitted signal which is leaked from the second transmitted signal into the receiving channel after the second transmitted signal flows through the second transmitting filter and a second receiving filter; and
(d) an intermodulation signal derived from the second transmitted signal; and
wherein the receiving channel is a channel for a receiver to receive signals;
combining the signals of the opposite phases.

2. The method according to claim 1, wherein:
the dividing the transmitted signal into the first transmitted signal and the second transmitted signal, and then inputting the first transmitted signal into the first transmitting filter and input the second transmitted signal into the second transmitting filter symmetric to the first transmitting filter, comprises:
using a divider to divide the transmitted signal into the first transmitted signal and the second transmitted signal whose phase difference is 90°, and then inputting the first transmitted signal into a first duplexer and inputting the second transmitted signal into a second duplexer, wherein
the first duplexer comprises the first receiving filter and the first transmitting filter, and the second duplexer comprises the second receiving filter and the second transmitting filter.

3. The method according to claim 2, wherein:
the first receiving filter is symmetric to the second receiving filter.

4. The method according to claim 2, wherein:
the adjusting the first interfering signal and the second interfering signal to obtain the signals of the opposite phases comprises:
inputting the first interfering signal, which is output from the first receiving filter, and the second interfering signal, which is output from the second receiving filter, into a 90° combiner for undergoing 90° phase shift, and then outputting the signals.

5. The method according to claim 1, wherein:
the dividing the transmitted signal into the first transmitted signal and the second transmitted signal, and then inputting the first transmitted signal into the first transmitting filter and input the second transmitted signal into the second transmitting filter symmetric to the first transmitting filter, comprises:
using a coupler to couple a part of the transmitted signal, inputting the part of the transmitted signal coupled by the coupler as a first transmitted signal into the first receiving filter, whereupon the first receiving filter inputs the first transmitted signal into the first transmitting filter, and inputting a part of the transmitted signal not coupled by the coupler as a second transmitted signal into a duplexer, wherein the duplexer comprises the second receiving filter and the second transmitting filter.

6. The method according to claim 5, wherein:
the adjusting the first interfering signal and the second interfering signal to obtain the signals of the opposite phases comprises:
inputting the first interfering signal, which is output from the first receiving filter, into a phase regulator for undergoing 180° phase shift, and then inputting the first interfering signal into the first transmitting filter, whereupon the first transmitting filter outputs the signal that has undergone the 180° phase shift.

7. An interference cancellation apparatus, comprising a processor and a non-transitory processor-readable medium having processor-executable instructions stored thereon, which when executed by the processor cause the processor to execute the following:
dividing a transmitted signal into a first transmitted signal and a second transmitted signal, and then inputting the first transmitted signal into a first transmitting filter and inputting the second transmitted signal into a second transmitting filter symmetric to the first transmitting filter;
adjusting a first interfering signal and a second interfering signal to obtain signals of opposite phases,
wherein the first interfering signal comprises at least one of the following:
a) a part of the first transmitted signal which is leaked from the first transmitted signal into a receiving channel after the first transmitted signal flows through the first transmitting filter and a first receiving filter, and
b) an intermodulation signal derived from the first transmitted signal,
wherein the second interfering signal comprises at least one of the following:
c) a part of the second transmitted signal leaked from the second transmitted signal into the receiving channel after the second transmitted signal flows through the second transmitting filter and a second receiving filter, and
d) an intermodulation signal derived from the second transmitted signal; and
wherein the receiving channel is a channel for a receiver to receive signals;
combining the signals of the opposite phases.

8. The apparatus according to claim 7, wherein the processor is further caused to execute the following:
dividing the transmitted signal into a first transmitted signal and a second transmitted signal whose phase difference is 90°, and then inputting the first transmitted signal into a first duplexer and inputting the second transmitted signal into a second duplexer, wherein the first duplexer comprises the first receiving filter and the first transmitting filter, and the second duplexer comprises the second receiving filter and the second transmitting filter.

9. The apparatus according to claim 8, wherein:
the first receiving filter is symmetric to the second receiving filter.

10. The apparatus according to claim 8, wherein the processor is further caused to execute the following:
performing 90° phase shift for the first interfering signal, which is output from the first receiving filter, and the second interfering signal, which is output from the second receiving filter, and then outputting the interfering signals.

11. The apparatus according to claim 7, wherein the processor is further caused to execute the following:
coupling a part of the transmitted signal, inputting the part of the transmitted signal coupled by the couple as the first transmitted signal into the first receiving filter;
wherein a part of the transmitted signal which is not coupled by the coupler is input as the second transmitted signal, into a duplexer that comprises the second receiving filter and the second transmitting filter.

12. The apparatus according to claim 11, wherein:
the second receiving filter is symmetric to the first receiving filter.

13. The apparatus according to claim 11, wherein the processor is further caused to execute the following:
performing 180° phase shift for the first interfering signal output by the first receiving filter, and then inputting the signal to the first transmitting filter.

14. The apparatus according to claim 13, wherein the processor is further caused to execute the following:
adjusting an amplitude of the first interfering signal output by the phase regulator, or, adjusting the amplitude of the first interfering signal output by the first receiving filter so that the amplitude of the first interfering signal is equal to an amplitude of the second interfering signal output by the second receiving filter.

15. The apparatus according to claim 11, wherein the processor is further caused to execute the following:
performing 180° phase shift for the first interfering signal output by the first receiving filter, and then inputting the obtained signal to the amplitude adjusting unit; and
adjusting an amplitude of the first interfering signal so that the amplitude of the first interfering signal is equal to an amplitude of the second interfering signal.

16. A base station, comprising an interference cancellation apparatus, wherein the interference cancellation apparatus comprises a processor and a non-transitory processor-readable medium having processor-executable instructions stored thereon,
which when executed causes the processor to implement the following:
dividing a transmitted signal into a first transmitted signal and a second transmitted signal, and then inputting the first transmitted signal into a first transmitting filter and inputting the second transmitted signal into a second transmitting filter symmetric to the first transmitting filter;
adjusting a first interfering signal and a second interfering signal to obtain signals of opposite phases,
wherein the first interfering signal comprises at least one of the following:
a) a part of the first transmitted signal which is leaked from the first transmitted signal into a receiving channel after the first transmitted signal flows through the first transmitting filter and a first receiving filter, and b) an intermodulation signal derived from the first transmitted signal, wherein the second interfering signal comprises at least one of the following:

c) a part of the second transmitted signal leaked from the second transmitted signal into the receiving channel after the second transmitted signal flows through the second transmitting filter and a second receiving filter, and d) an intermodulation signal derived from the second transmitted signal; and wherein the receiving channel is a channel for a receiver to receive signals; and combining the signals of the opposite phases.

17. The apparatus according to claim 16, wherein the processor is further caused to execute the following:

dividing the transmitted signal into a first transmitted signal and a second transmitted signal whose phase difference is 90°, and then inputting the first transmitted signal into a first duplexer and inputting the second transmitted signal into a second duplexer, wherein the first duplexer comprises the first receiving filter and the first transmitting filter, and the second duplexer comprises the second receiving filter and the second transmitting filter.

18. The apparatus according to claim 17, wherein:

the first receiving filter is symmetric to the second receiving filter.

19. The apparatus according to claim 17, wherein the processor is further caused to execute the following:

performing 90° phase shift for the first interfering signal, which is output from the first receiving filter, and the second interfering signal, which is output from the second receiving filter, and then outputting the interfering signals.

20. The apparatus according to claim 16, wherein the processor is further caused to execute the following:

coupling a part of the transmitted signal, inputting the part of the transmitted signal coupled by the couple as the first transmitted signal into the first receiving filter;

wherein a part of the transmitted signal which is not coupled by the coupler is input as the second transmitted signal, into a duplexer that comprises the second receiving filter and the second transmitting filter.

* * * * *